(12) United States Patent
Sarukkai et al.

(10) Patent No.: US 9,405,775 B1
(45) Date of Patent: Aug. 2, 2016

(54) RANKING VIDEOS BASED ON EXPERIMENTAL DATA

(71) Applicant: Google Inc., Mountain View, CA (US)

(72) Inventors: Ramesh Rangarajan Sarukkai, Los Gatos, CA (US); Juhyun Lee, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 119 days.

(21) Appl. No.: 13/833,133

(22) Filed: Mar. 15, 2013

(51) Int. Cl.
*G06F 17/30* (2006.01)

(52) U.S. Cl.
CPC ............................. *G06F 17/30286* (2013.01)

(58) Field of Classification Search
CPC .......... G06Q 30/0242; G06Q 30/0277; G06Q 99/005; G06Q 30/02; G06Q 30/0261; G06Q 30/0269; G06Q 10/00; G06F 17/30; G06F 3/00; G06F 17/30864; G06F 13/30017; G06F 17/30038; G06F 3/04842; G06F 3/0484; H04N 21/23424; H04N 21/454; H04N 21/4316; H04N 21/26241; H04N 21/4331; H04N 21/458; H04N 71/025; H04N 5/445; H04N 7/12; H04N 21/25883; H04N 21/812; H04L 67/42; H04L 65/607; H04L 65/4084; H04L 29/06027; H04L 51/046
USPC .......... 707/723, 728, 709, 741, E17.064, 742, 707/767, 759, 765, 766, 768, 769, 736, 705, 707/E17.071, E17.044, E17.005, E17.121, 707/748, 722, 732, 749, 735, 798, 673, 706, 707/E17.108, 7.071; 705/5, 10, 14.43, 14, 705/25, 14.41, 14.49, 14.42, 14.4, 14.73, 705/14.54, 7.11, 7.14, 7.29, 35, 319; 384/135, 208.6, 411, 705, E07.085, 384/E07.003, 14.08, E07.083, E07.83; 715/723, 719, 720, 750, 738, 736, 230, 715/704, 716, 781, 236, 854; 725/9, 32, 34, 725/35, 113, 112, 62, 134, 46, 45, 47, 36, 725/39, 40, 43, 44, 48, 4, 41, 146, 145, 416, 725/110, 109, 24, 19, 715, 42, 49; 386/283, 386/289, 262, 287, 285, 286, 239, 241, 240, 386/343, 278; 382/156, 159, 190, 229, 305, 382/233, 100, 224, 155
See application file for complete search history.

(56) References Cited

U.S. PATENT DOCUMENTS 7,966,632 B1 *   6/2011   Pan et al. ........................ 725/46
8,180,667 B1 *   5/2012   Baluja ................ G06Q 30/0217
                                                      705/14.19

(Continued)

OTHER PUBLICATIONS

Germán Moltóand Jose F. Monserrat—"Leveraging Distance Learning of Engineering Skills Through Video Exercises"—Conference Paper • January 2011—3rd International Conference on . . . , 2011—researchgate.net—pp. 1-9.*

(Continued)

*Primary Examiner* — Anh Ly
(74) *Attorney, Agent, or Firm* — Fenwick & West LLP

(57) ABSTRACT

A system and method for ranking additional videos based on experiment data. The system includes an additional video request retrieval unit to receive a request for a plurality of additional videos, and a number of the plurality of additional videos based on a video being served; an additional video database to retrieve the plurality of additional videos based on the video, and to retrieve a relevance ranking for each of the plurality of additional videos, a monetization ranking for each of the plurality of additional videos, and a likelihood ranking for each of the plurality of additional videos, the likelihood ranking being sourced from the experimental data; a weighting/ranking unit to assign a score for each of the plurality of videos based on the retrieved rankings from the additional video database; and an additional video selection unit to select the number of the plurality of videos based the score.

22 Claims, 3 Drawing Sheets

(56) References Cited

U.S. PATENT DOCUMENTS

| | | | |
|---|---|---|---|
| 8,220,022 B1* | 7/2012 | Pan et al. ..................... 725/46 |
| 8,572,647 B2* | 10/2013 | Liu ..................... G06Q 30/02 |
| | | | 709/224 |
| 8,737,817 B1* | 5/2014 | Izo et al. ..................... 386/287 |
| 8,789,108 B2* | 7/2014 | Gibbs et al. ..................... 725/46 |
| 8,959,083 B1* | 2/2015 | Gyongyi ............... G06Q 10/00 |
| | | | 705/319 |
| 2003/0229900 A1* | 12/2003 | Reisman ........... G06F 17/30873 |
| | | | 725/87 |
| 2004/0010544 A1* | 1/2004 | Slater ................. G06F 11/3433 |
| | | | 709/203 |
| 2008/0060013 A1* | 3/2008 | Sarukkai ........... G06F 17/30781 |
| | | | 725/46 |
| 2008/0066107 A1* | 3/2008 | Moonka et al. ................. 725/34 |
| 2008/0189272 A1* | 8/2008 | Powers ............ G06F 17/30817 |
| | | | 707/E17.014 |
| 2008/0262912 A1* | 10/2008 | Gargi ................ G06Q 30/0241 |
| | | | 705/14.4 |
| 2008/0275763 A1* | 11/2008 | Tran et al. ....................... 705/10 |
| 2008/0281679 A1* | 11/2008 | Shehan ................. G06Q 30/02 |
| | | | 705/7.31 |
| 2009/0006368 A1* | 1/2009 | Mei et al. ........................... 707/5 |
| 2009/0006375 A1* | 1/2009 | Lax ..................... H04N 21/435 |
| | | | 707/E17.014 |
| 2009/0133059 A1* | 5/2009 | Gibbs .............. G06F 17/30038 |
| | | | 725/34 |
| 2009/0259927 A1* | 10/2009 | Fisher .............. G06F 17/30864 |
| | | | 715/205 |
| 2010/0223116 A1* | 9/2010 | Wu .................. G06F 17/30864 |
| | | | 705/14.16 |
| 2010/0242060 A1* | 9/2010 | Liu ........................ G06Q 30/02 |
| | | | 725/9 |
| 2010/0250341 A1* | 9/2010 | Hauser ............. G06F 17/30867 |
| | | | 707/769 |
| 2010/0332304 A1* | 12/2010 | Higgins ................ G06Q 30/02 |
| | | | 705/14.16 |
| 2011/0066506 A1* | 3/2011 | Sung ..................... G06Q 30/02 |
| | | | 705/14.66 |
| 2011/0107220 A1* | 5/2011 | Perlman ........................ 715/720 |
| 2011/0167061 A1* | 7/2011 | Li et al. ......................... 707/728 |
| 2011/0320437 A1* | 12/2011 | Kim .................. G06F 17/30522 |
| | | | 707/722 |
| 2013/0031593 A1* | 1/2013 | Booth ................ H04N 21/4314 |
| | | | 725/110 |
| 2013/0073360 A1* | 3/2013 | Caplan .................. G06Q 30/02 |
| | | | 705/14.16 |
| 2013/0142418 A1* | 6/2013 | van Zwol et al. ............. 382/159 |
| 2013/0268479 A1* | 10/2013 | Andler et al. .................. 707/602 |
| 2013/0325550 A1* | 12/2013 | Varghese et al. ............. 705/7.31 |
| 2014/0052502 A1* | 2/2014 | Razvi et al. ................... 705/7.39 |
| 2014/0074866 A1* | 3/2014 | Shah ................. G06F 17/30817 |
| | | | 707/749 |
| 2014/0172961 A1* | 6/2014 | Clemmer et al. ............. 709/203 |
| 2014/0319209 A1* | 10/2014 | Beadles ............. G06Q 30/0207 |
| | | | 235/375 |
| 2015/0081604 A1* | 3/2015 | Duque .............. H04L 29/06462 |
| | | | 706/12 |
| 2015/0160806 A1* | 6/2015 | Fey ....................... G06F 3/0484 |
| | | | 715/748 |

OTHER PUBLICATIONS

Karla Okada et al.—"Advertisement selection for online videos"—Published in: Proceeding WebMedia '12 Proceedings of the 18th Brazilian symposium on Multimedia and the web—WebMedia'12, Oct. 15-18, 2012, São Paulo/SP, Brazil—pp. 367-374.*

Todd J. Underwood & Spencer G. Sealy—"Grasp-ejection in two small ejecters of cowbird eggs: a test of bill-size constraints and the evolutionary equilibrium hypothesis"—Animal Behaviour—vol. 71, Issue 2, Feb. 2006, pp. 409-416.*

B. P. Van Poppel et al.—"Virtual Laboratory Development for Undergraduate Engineering Courses"—Published in: Information Technology Based Higher Education and Training, 2004. ITHET 2004. Proceedings of the Fifth International Conference on Date of Conference: May 31-Jun. 2, 2004—pp. 644-649.*

* cited by examiner

RANKING VIDEOS BASED ON EXPERIMENTAL DATA

BACKGROUND

Video sharing web sites host numerous videos sourced by users or content providers. Internet users may view the videos by visiting the video sharing web site, or by accessing an external site linked to one of the videos stored on the video sharing web site.

The video sharing web site operator may be incentivized to augment the serving of videos with shared content. Shared content may be directed towards goods or services, and include information about the goods or services and/or meta data associated with the goods or services. The meta data may include a link to an external web site, serving additional information about the goods or services.

The shared content may be incorporated instream along with the presentation of the video. Thus, if a user accesses a video, the shared content may be played before or during the presentation of the video.

The contributors of videos, and the operator of the video sharing web site may decide which videos include a monetization amount. Thus, if a contributor uploads a video, a decision may be made to monetize the video. The actual monetization may be determined on a basis of the number of video views. Additionally, the monetization of the content may be contingent on whether a user of the video sharing web site clicks-through the shared content.

The video sharing web site operator may also determine to include additional videos to be selected by the user viewing an original video. For example, while a user is viewing an original video, thumbnails and text descriptions of additional videos may be presented simultaneously, or directly after the viewing of the original video.

The selection of these additional videos may be determined based on a relevance to the original video being watched, and a monetization value associated with the video. Thus, the video sharing web site may maximize revenue by serving additional videos that may have an increased chance in leading to monetization (i.e. the user selecting a link to watch one of the additional videos presented).

Additionally, experiments may be performed on various users in regards to the instream shared content. The video sharing web site may maintain a probability of leaving the web site based on a user's interaction with the instream shared content. Thus, based on the experiments, various data may be collected about the user's interaction with instream shared content. For example, this data may include the likelihood the user leaves the video sharing web site, the likelihood the user skips the shared content, and the like.

SUMMARY

A system and method for ranking additional videos based on experiment data is provided. The system includes an additional video request retrieval unit to receive a request for a plurality of additional videos, and a number of the plurality of additional videos based on a video being served; an additional video database to retrieve the plurality of additional videos based on the video, and to retrieve a relevance ranking for each of the plurality of additional videos, a monetization ranking for each of the plurality of additional videos, and a likelihood ranking for each of the plurality of additional videos, the likelihood ranking being sourced from the experimental data; a weighting/ranking unit to assign a score for each of the plurality of videos based on the retrieved rankings from the additional video database; and an additional video selection unit to select the number of the plurality of videos based the score.

DESCRIPTION OF THE DRAWINGS

The detailed description refers to the following drawings, in which like numerals refer to like items, and in which.

DETAILED DESCRIPTION

Figure 1:
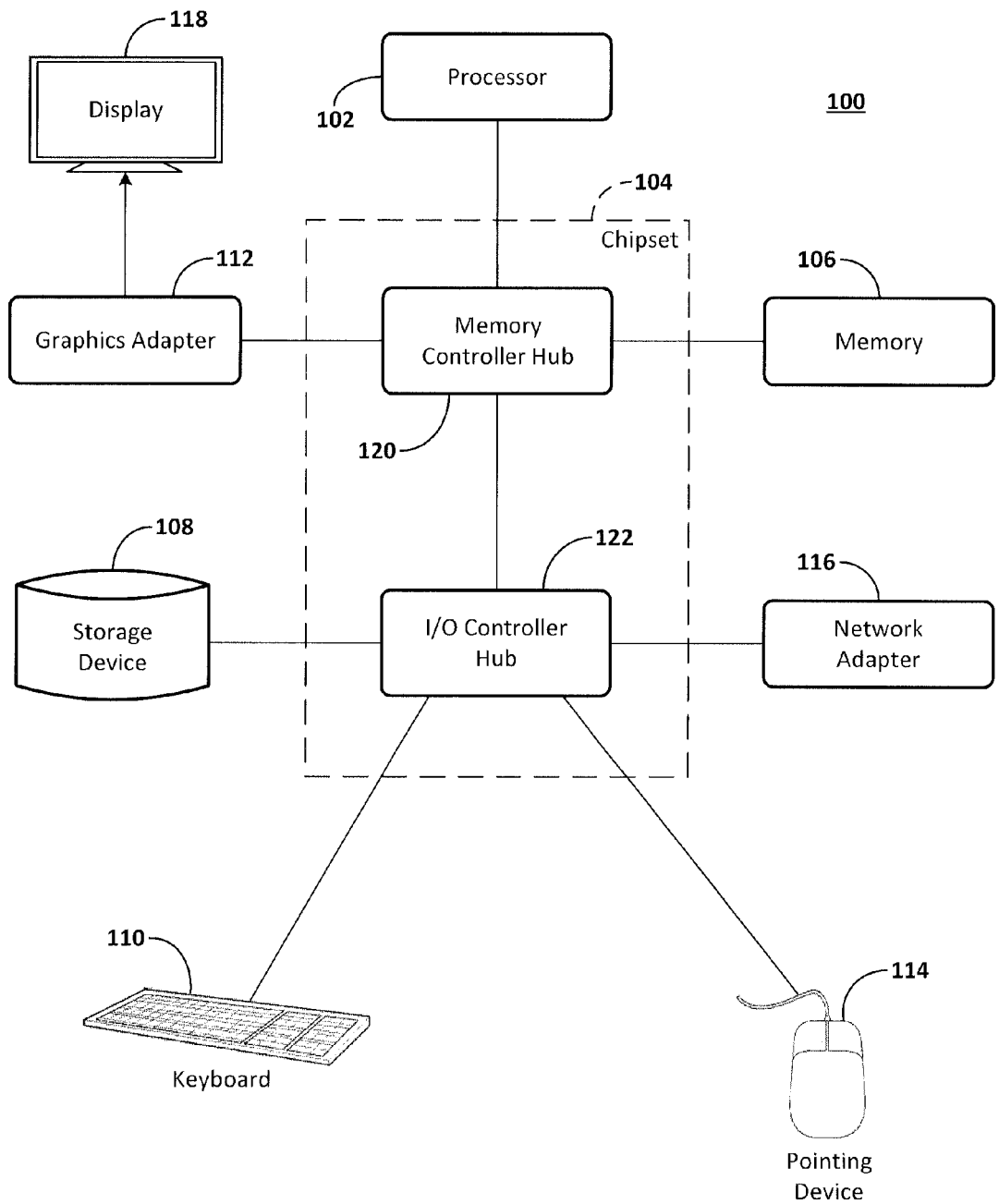
FIG. 1 is a block diagram illustrating an example computer.

The video sharing web site may present additional videos along with the viewing of an original video based on certain heuristics. For example, the additional videos may be chosen based on relevance. If the user viewing the video is watching a video associated with artist 'X', the video sharing web site may serve additional videos related to artist 'X'.

Additionally, the video sharing web site may determine that certain videos are more likely to be watched and/or monetized. A video being monetized is defined by an owner of the rights associated with the video giving permission to the video sharing web site to generate revenue from the video based on the addition of shared content. The monetization may occur based on a user to the video sharing web site clicking-through the shared content. Thus, based on the number of views and the video being able to be monetized, the video sharing web site may rank the videos and present the videos with the highest rank as additional videos.

Upon repeatedly showing irrelevant shared content, users may leave the web site due to accumulated, reduced user experiences over time. Thus, the ability to monetize a video can be frustrated in these situations.

In order to avoid this, the video sharing web site may maintain experimental data on the shared content. Specifically, through machine learning techniques, the video sharing web site may maintain a record of the likelihood that shared content will be watch through in its entirety, the average length of time the shared content will be watched, and whether the shared content will lead to a user leaving the video sharing web site.

The systems and methods disclosed herein rank videos to be presented alongside an original video based on experimental data associated with the shared content. The systems and method disclosed herein further rank the additional videos to be viewed by determining the monetization associated with the video, as well as incorporating the experimental data described above. Thus, additional videos may be chosen based on whether the videos are able to be monetized, and if presented alongside instream shared content, a user viewing of the shared content is maximized. Thus, by not only relying on a video being relevant and able to be monetized, the video sharing web site may realize greater revenue.

In situations in which the systems discussed here collect personal information about users, or may make use of personal information, the users will be provided with an opportunity to control whether programs or features collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user will have control over how information is collected about the user and used by a content server.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer system 100. The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. For example, a data store, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

Figure 2:
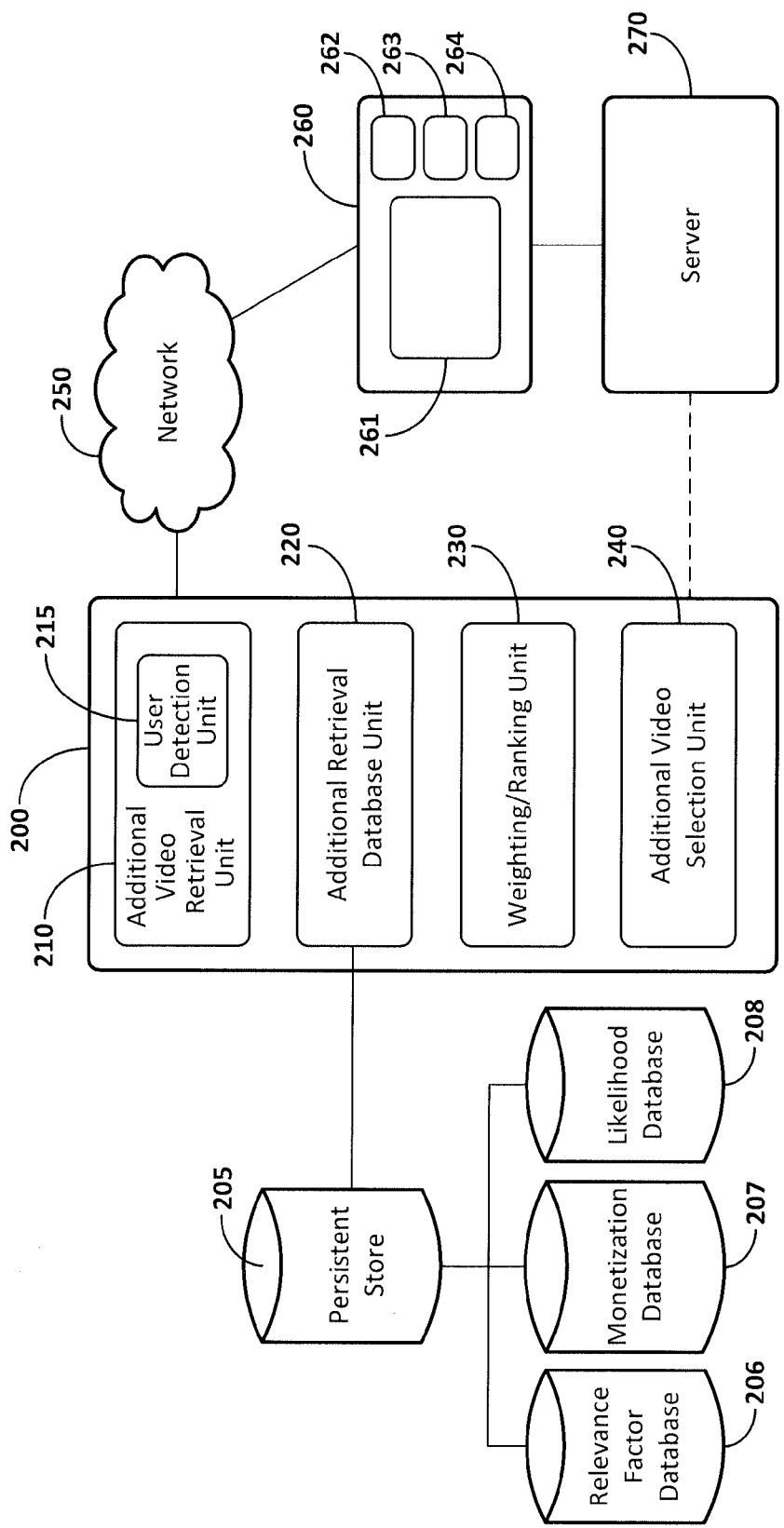
FIG. 2 illustrates an example of a system for ranking additional videos based on experimental data.

FIG. 2 illustrates a system 200 for ranking videos based on experimental data. The system 200 includes an additional video retrieval unit 210, additional video database 220, a weight/ranking unit 230, and an additional video selection unit 240. The system 200 may be implemented on a device, such as computer 100.

System 200 communicates, via network 250, to a video sharing web site 260 stored on a server 270. The video sharing web site 260 displays a video 261, and thumbnails 262, 263 and 264 directed additional videos. The selection of the additional videos and the order in which the additional videos are displayed is performed by aspects disclosed in conjunction with system 200. Alternatively, system 200 may be incorporated as part of the server 270.

The additional video retrieval unit 210 detects a request for additional videos. This may happen at the same time the video sharing web site 260 presents a video or shortly after, or changes to a new video to display. Thus, the additional video retrieval unit 210 may receive an indication from the video sharing web site 260, along with the number of additional videos to retrieve. The number of additional videos to retrieve may be contingent on the medium in which the video sharing web site 260 is being displayed. For example, if the video sharing web site 260 is being displayed on a smart phone, the number of additional videos to display with the video being watched may be small. Alternatively, if the video sharing web site 260 is displayed on a laptop, the number of additional videos to display with the video being watched may be large.

The additional video retrieval unit 210 may include a user detection unit 215. The user detection unit 215 may identify the user viewing the video, if the user has logged in to the video sharing web site 260. Thus; the aspects disclosed in conjunction with system 200 may be performed on the video sharing web site 270 user base (or for all users that have electively opted-in), or on a per user basis (as detected by the user detection unit 215).

The additional video database unit 220, based on the request generated by the additional video retrieval unit 210, may select germane additional videos from a persistent store 205. The persistent store 205 may be a data storage device, such as data store 108 described above. The persistent store 205 includes a relevance factor database 206, a monetization database 207 and a probability of leaving page (likelihood') database 208.

The additional video database unit 220 selects additional videos that are related to the video 261 currently being played. As described above, the related videos may be selected based on various heuristics, such as a similarity to video 261, for example.

Additionally, various rankings may be retrieved for each additional video retrieved from the persistent store 205. A rank for how relevant each video may be retrieved from the relevance factor database 206. A rank for how the additional video is capable of being monetized may be retrieved from the monetization database 207. A rank for the amount of time visitors (or the specific user) views shared content when presented with the video 261 is retrieved from the likelihood database 208.

The weight/ranking unit 230 takes the subset of videos retrieved by the additional video database unit 220, and employing a weighting or a ranking operation, determines the rank for each of the additional videos. Each ranking for the three enumerated categories above may be given a score (with a higher rank being given a higher score). For example, each additional video may be scored by the following expression (Equation 1):

$$\text{Additional Video Score }[n] = (\text{predefined weight for relevance})*(\text{relevance\_rank}[n]) + (\text{predefined weight for monetization})*(\text{monetization\_rank}[n]) + (\text{predefined weight for likelihood})*(\text{likelihood\_rank}[n]) \rightarrow \text{where } n \text{ represents each additional video}$$

The additional video selection unit 240, determines based on the ranking determined by the weighting/ranking unit 230, the additional videos to be communicated to the video sharing web site 260. The number of additional videos sent may be determined based on the number indicated in the initial request. As shown in FIG. 2, the video sharing web site 260 has slots for three additional videos (additional videos 261-263). Thus, the additional video selection unit 240 may communicate the three highest ranked additional videos to the video sharing web site 260.

Figure 3:
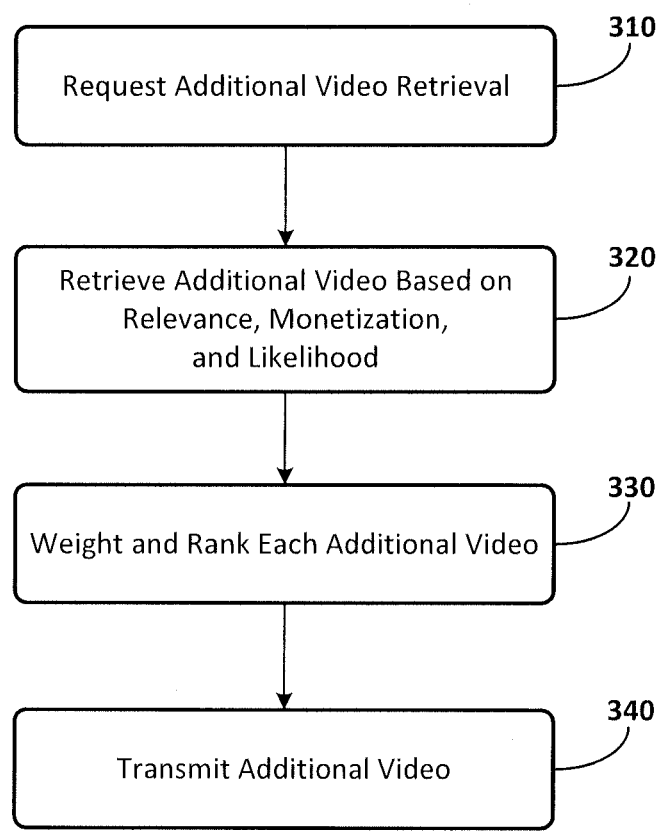
FIG. 3 illustrates an example of a method for ranking additional videos based on experimental data.

FIG. 3 illustrates an example of a method 300 for ranking videos based on experimental data. The method 300 may be implemented on the system 200.

In operation 310, a request for additional videos is received. For example, a video sharing web site 260, as described above, may instigate a request for additional videos to augment the presentation of a video presently being served. The requesting source may also provide a number of additional videos requested.

In operation 310, in addition to the request being received, a specific user associated with the request may also be transmitted. Thus, the aspects described in method 300 may be performed for all the users associated with the video sharing web site 260, or on a per user basis.

In operation 320, additional videos may be retrieved that are related to a video being presently served by the video sharing web site 260. In retrieving the additional videos, various rankings may also be retrieved as described above in regards to the persistent store 205. Thus, each additional video retrieved may also include a ranking associated with how relevant the additional video is, the monetization associated with the additional video, and a likelihood that the user will not skip through shared content associated with the additional video.

In operation 330, the retrieved additional videos are weighted and ranked. In performing this operation, method 300 may employ a similar equation as described above in regards to equation 1. Thus, each additional video is assigned a score.

In operation 340, based on the number of videos requested by the video sharing web site, the additional videos with the highest scores are transmitted to the video sharing web site. Thus, the additional videos presented to a user represent the videos that are not only relevant and capable of being monetized, but are also likely to lead to a viewing (or maximize the viewing) of shared content served instream with the additional video.

The examples described in FIGS. 2 and 3, illustrate an interaction with a video sharing web site. However, the aspects disclosed herein may be employed with other media sharing sources, such as audio sharing sources, or the like.

Certain devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide non-volatile storage of computer readable instructions, data structures, program modules and other data for the computing system.

To enable human (and in some instances, machine) user interaction, the computing system may include one or more input devices, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIG. 3. The disclosed devices, components, and systems contemplate using or implementing any suitable technique for performing the steps illustrated in these figures. Thus, FIG. 3 is for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system, comprising:
   a data store comprising a computer readable medium storing a program of instructions for performing ranking of videos based on experimental data;
   a processor that executes the program of instructions;
   an additional video request retrieval unit that receives a request for a plurality of additional videos;
   an additional video database that:
      retrieves the plurality of additional videos; and
      retrieves respective relevance rankings for the plurality of additional videos, respective monetization rankings for the plurality of additional videos, and respective likelihood rankings for the plurality of additional videos, the likelihood ranking being sourced from the experimental data;
   a weighting/ranking unit that assigns respective scores for the plurality of additional videos based on the retrieved respective relevance rankings, the retrieved respective monetization rankings and the retrieved respective likelihood rankings from the additional video database; and
   an additional video selection unit that selects a number of the plurality of additional videos based on one or more of the respective scores.

2. The system of claim 1, wherein the program of instructions further comprises an instruction to transmit the selected plurality of additional videos to a video sharing web site.

3. The system of claim 2, wherein the experimental data is based on whether the video is presently being served from the video sharing web site.

4. The system of claim 2, wherein the experimental data is based on users associated with the video sharing web site.

5. The system of claim 2, wherein the number of the plurality of additional videos is also based on available space to display the plurality of additional videos on the video sharing web site.

6. The system of claim 2, wherein the experimental data comprises information indicative of a record of users associated with the video sharing web site that indicate a likelihood of a specific additional video of the plurality of additional videos being viewed in entirety when augmented with shared content.

7. The system of claim 2, wherein the experimental data comprises information indicative of a record of users associated with the video sharing web site that indicate a time that shared content when presented with a specific additional video of the plurality of additional videos has a defined likelihood of being skipped.

8. The system of claim 1, wherein one or more of the respective scores is also based on a defined weighting applied to the respective relevance ranking, the monetization ranking and the likelihood ranking, respectively.

9. A method, comprising:
   receiving, using a device comprising a processor that ranks videos based on experimental data, a request for a plurality of additional videos;
   retrieving the plurality of additional videos;
   retrieving respective relevance rankings for the plurality of additional videos, respective monetization rankings for the plurality of additional videos, and respective likelihood rankings for the plurality of additional videos, one or more of the respective likelihood rankings being sourced from the experimental data;
   assigning respective scores for the plurality of additional videos based on the retrieved respective rankings; and
   selecting a number of the plurality of additional videos based on one or more of the respective scores.

10. The method of claim 9, wherein the selected plurality of additional videos is transmitted to a video sharing web site.

11. The method of claim 10, wherein the experimental data is based on whether the video is presently being served from the video sharing web site.

12. The method of claim 10, wherein the experimental data is based on all users associated with video sharing web site.

13. The method of claim 10, wherein the number is based on available space to display additional videos on the video sharing web site.

14. The method of claim 10, wherein the experimental data comprises information indicative of a record of users associated with the video sharing web site that indicate a likelihood of a specific additional video of the plurality of additional videos being viewed in entirety when augmented with shared content.

15. The method of claim 10, wherein the experimental data comprises information indicative of a record of users associated with the video sharing web site that indicate a time that shared content when presented with a specific additional video of the plurality of additional videos has a defined likelihood of being skipped.

16. The method of claim 9, wherein the score is calculated based on a predefined weighting applied to the relevance ranking, the monetization ranking and the likelihood ranking, respectively.

17. A non-transitory computer-readable medium having stored thereon computer-executable instructions that, in response to execution, cause a system to perform operations, including:
   retrieving a plurality of additional videos and a request for the plurality of additional videos, wherein the plurality of additional videos are ranked based on experimental information;
   assigning respective scores for the plurality of additional videos based on retrieved respective monetization rankings of the plurality of additional videos; and
   selecting a number of the plurality of additional videos based on one or more of the respective scores.

18. The non-transitory computer-readable medium of claim 17, wherein the respective rankings comprise respective likelihood rankings for the plurality of additional videos.

19. The non-transitory computer-readable medium of claim 17, wherein the experimental information comprises information indicative of a record of users associated with the video sharing web site that indicate a time that shared content when presented with a specific additional video of the plurality of additional videos has a defined likelihood of being skipped.

20. A method, comprising:
- receiving a request for additional videos via a client device;
- retrieving a plurality of additional videos;
- determining likelihood rankings for the plurality of additional videos, the likelihood ranking for each of the plurality of additional videos based on experimental data for the additional video and the likelihood ranking indicative of a likelihood that the additional video is watched in its entirety on the client device if the additional video is displayed on the client device;
- assigning, by a device comprising a processor, a plurality of scores to the plurality of additional videos based on the likelihood rankings; and
- selecting a number of the plurality of additional videos to display on the client device for selection by the user based on the plurality of scores.

21. The method of claim 20, wherein the experimental data includes a total amount of time a plurality of users viewed the additional video.

22. The method of claim 21, further comprising:
- retrieving monetization rankings for the plurality of additional videos, the monetization ranking for each additional video based on a number of total views the additional video received; and
- wherein the plurality of scores for the plurality of additional videos is further based on the monetization rankings.

* * * * *